Oct. 6, 1925.
W. C. BECKMANN
1,556,401
FISH TRAP APRON
Filed Dec. 1, 1924
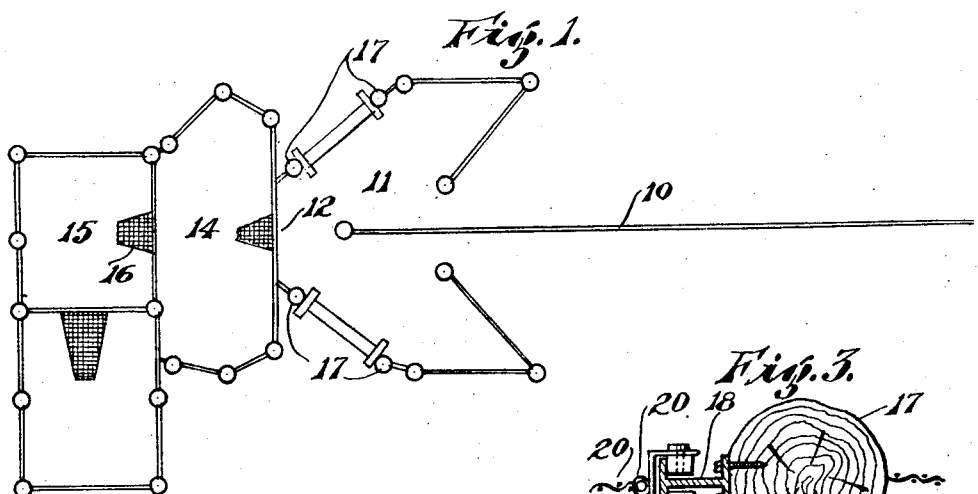
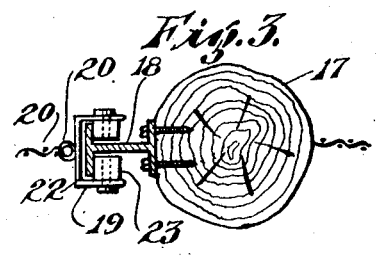
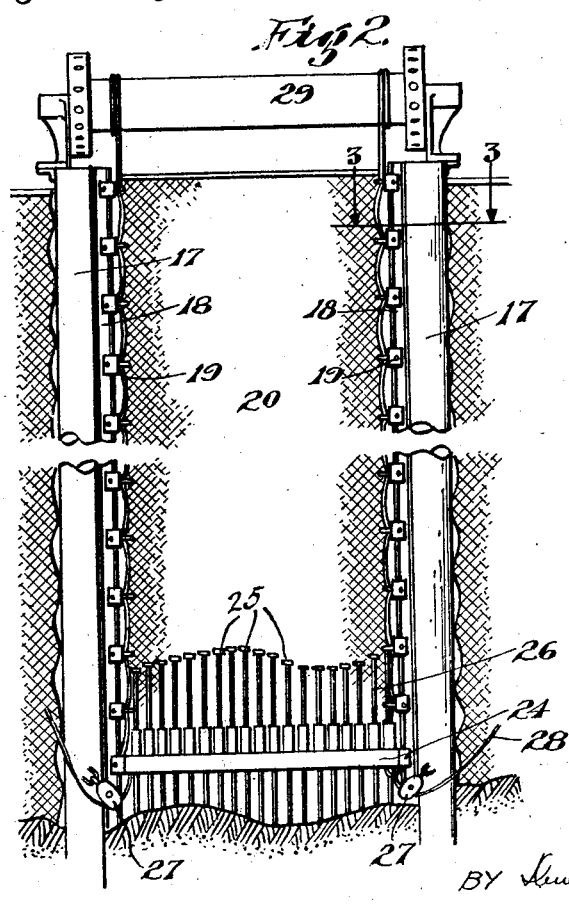
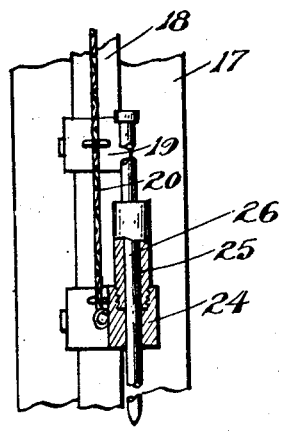
INVENTOR
WM. C. BECKMANN
BY Dewey, Strong Townsend & Loftus
ATTYS.

Patented Oct. 6, 1925.

1,556,401

UNITED STATES PATENT OFFICE.

WILLIAM C. BECKMANN, OF BERKELEY, CALIFORNIA.

FISH-TRAP APRON.

Application filed December 1, 1924. Serial No. 753,165.

*To all whom it may concern:*

Be it known that I, WILLIAM C. BECKMANN, a citizen of the United States, residing at Berkeley, county of Alameda, and State of California, have invented new and useful Improvements in Fish-Trap Aprons, of which the following is a specification.

This invention realtes to fish traps, and more particularly pertains to aprons for use in traps employed in the salmon fishing industry.

In conformity with the law requiring salmon fishing traps to be closed for a definite period at regular intervals, the heart walls of the traps in general use are fitted with so-called aprons usually arranged between two upright members. These aprons are required to be removed when the trap is closed to permit the exit of fish from the heart of the trap.

Prior to my invention, the aprons consisted of webbing or netting secured at one side to one of the uprights and at the other side to a long pole or "shove-down" which, when the apron was in closed position, was disposed parallel and in close proximity to the other upright. To dispose the apron in open position the upper end of the "shove-down" was drawn over and secured to the opposite upright. Thus, the "shove-down" was diagonally arranged between the uprights. This type of apron did not prove entirely satisfactory, because of the difficulty in keeping the loose folds of webbing, created by the position of the "shove-down", in a position unobstructing the heart opening.

Therefore, it is the principal object of the present invention to provide a generally improved apron construction for traps of the character described.

One form which the invention may assume is exemplified in the following description and illustrated by way of example in the accompanying drawings, in which:

Fig. 1 is a diagrammatic view in plan of a stationary fish trap.

Fig. 2 is a view in elevation of the preferred form of my improved apron.

Fig. 3 is a view in plan section taken on line 3—3 of Fig. 2 and disclosing the construction of the travelers.

Fig. 4 is a fragmentary view in vertical section taken on line 4—4 of Fig. 2, and disclosing the construction of the lower end of the apron which renders the latter capable of automatically conforming to the contour of the body.

Referring more particularly to the accompanying drawings, Fig. 1 diagrammatically illustrates the main portion of a stationary fish trap of the type in general use in the salmon fishing industry. In general, this trap comprises a lead 10 which is fixed substantially at right angles to the path of tides and which usually extends from a point on shore to a point within what is known as the heart of the trap indicated at 11. The peculiar arrangement of the walls of the heart 11 tend to direct the fish entrapped therein through a heart tunnel 12 into the pot 14 of the trap. The pot 14 communicates with spillers 15 through a tunnel 16. Fish passing into the pot 14 through the heart tunnel finally pass through the tunnel 16 into the spillers from which they are removed to barges or other conveyances.

Stationary traps are usually formed of piles driven at intervals and which act as supports for the netting forming the various walls of the trap.

For preservation of the fish, in certain sections, all traps operated are required to be made non-fishing for a definite period each week. This is effected by opening a portion of the heart walls and by closing the heart tunnel. The portion of the heart walls opened are termed aprons and are those at the sides of the heart in substantial alignment with the end of the lead 10. This permits fish passing around the end of the lead to pass directly out of the trap. In Fig. 1 the heart wall openings are shown as occurring between the piles 17. These openings are fitted with removable aprons as will be described.

The present invention is more particularly concerned with an apron for the heart wall openings, which, as described, are required to be left open during the so-called "closed period" of the trap. This apron is more clearly illustrated in Figs. 2 to 4, inclusive, and comprises upright piles 17 spaced at the proper distance apart. Vertical guide rails 18 are fixed to the adjacent surfaces of the piles 17 for the reception of travelers 19 carried at opposite sides of an apron or closure 20. This apron or closure 20 substantially agrees in width with the distance between the rails 18 and is preferably formed of cotton or wire netting having a flexible binding strip or rope at its marginal edge. This binding rope at the sides of the apron is attached to eyelets 21 fixed on the travelers 19.

In Fig. 3 will be seen that the guide rails 18 are of I-beam section. The travelers each have a channel shaped frame 22, the toe portions of which are adapted to embrace the outer flange of the rail. The toe portions of the frame 22 carry rollers 23 adapted to bear against the inner surface of the outer flange of the rail and to confine the same between the base of the frame and the rollers.

At the bottom of the apron I arrange a horizontally disposed base bar 24 which extends across the bottom of the apron and is fitted at each end with a traveler 19. This base bar is formed with a plurality of vertical guideways 25 in which pins 26 are slidably mounted. This construction is clearly illustrated in Figs. 2 and 4 and permits the apron to effectively close the opening between the piles 17 regardless of the irregularities of the bottom. It is obvious that when the apron is lowered, the pins 26 will automatically adjust themselves to any irregularities in the bottom and act as an effective screen to prevent the escape of fish beneath the apron proper.

To lower the apron to its "fishing" position, pulleys 27 are mounted at the lower ends of the piles 17. Ropes 28 are connected at one end to the base bar and reaved through these pulleys 27 and then lead to a point above the surface where they can be manipulated to properly effect the pulling down of the apron.

To remove the apron when the trap is "closed" I arrange a windlass 29 above the apron. This windlass is connected by ropes to the top of the apron and may be rotated to elevate the apron and wind it around the windlass. When lowering the apron a strain is placed on the pull down ropes 28 and the travelers 18 are guided onto the rails to permit the apron to be lowered to fishing position.

It is obvious from the foregoing that I have provided an apron for fish traps which may be easily and quickly operated to open and close it.

While in the present instance I have shown my apron as applied to pile driven traps, it will be apparent to those skilled in the art that it can be just as readily applied to floating traps and in such connection operate just as effectively.

While I have shown the preferred form of my invention, it is understood that various changes in its construction may be made by those skilled in the art without departing from the spirit of the invention as defined in the appended claims.

Having thus described my invention, what I claim and desire to secure by Letters Patent is:

1. In combination with a fish trap having a heart wall opening therein, upright members at the sides of said opening and stationary relative to said trap, an apron adapted to form a closure between said upright members, connections between the sides of said apron and said upright members, said connections permitting said apron to be vertically moved relative to said upright members, and means at the lower end of said apron adapted to automatically conform to the bottom and to cooperate with the apron proper to effect a complete closure of the space intermediate the uprights.

2. In combination with a fish trap having a heart wall opening therein, upright members at the sides of said opening and stationary relative to said trap, an apron adapted to form a closure between said upright members, guide means fixed to said upright members, and means on the sides of the apron adapted to cooperate with the guide means to connect the apron to said upright members and to permit vertical movement of the apron relative to the upright members.

3. In combination with a fish trap having a heart wall opening therein, upright members at the sides of said opening and stationary relative to said trap, an apron adapted to form a closure between said upright members, guide means fixed to said upright members, travelers mounted at spaced distances along the sides of the apron and adapted to engage and cooperate with the guide means to connect the apron with the upright members and permit vertical movement of the apron relative to the upright members.

4. In combination with a fish trap having a heart wall opening therein, upright members at the sides of said opening and stationary relative to said trap, an apron adapted to form a closure between said upright members, guide means fixed to said upright members, and means on the sides of the apron adapted to cooperate with the guide means to connect the apron to said upright members and to permit vertical movement of the apron relative to the upright members, and means at the lower end of said apron adapted to automatically conform with the bottom and thereby cooperate with the apron to effect a complete closure of the space between the upright members.

5. In combination with a fish trap having a heart wall opening therein, upright members at the sides of said opening and stationary relative to said trap, an apron adapted to form a closure between said upright members, guide means fixed to said upright members, travelers mounted at spaced distances along the sides of the apron and adapted to engage and cooperate with the guide means to connect the apron with the upright members and permit vertical movement of the apron relative to the upright members, and means at the lower end of said apron adapted to automatically conform with the bottom and thereby cooperate with the apron to effect a complete closure of the space between the upright members.

6. In combination with a fish trap having a heart wall opening therein, upright members at the sides of said opening and stationary relative to said trap, an apron adapted to form a closure between said upright members, guide means fixed to said upright members, travelers mounted at spaced distances along the sides of the apron and adapted to engage and cooperate with the guide means to connect the apron with the upright members and permit vertical movement of the apron relative to the upright members, and a windlass disposed above the apron and capable of operation to elevate the apron and wind in onto the windlass.

7. In combination with a fish trap having a heart wall opening therein, upright members at the sides of said opening and stationary relative to said trap, an apron adapted to form a closure between said upright members, guide means fixed to said upright members, travelers mounted at spaced distances along the sides of the apron and adapted to engage and cooperate with the guide means to connect the apron with the upright members and permit vertical movement of the apron relative to the upright members, and means at the lower end of said apron adapted to automatically conform with the bottom and thereby cooperate with the apron to effect a complete closure of the space between the upright members, and a windlass disposed above the apron and capable of operation to elevate the apron and wind it onto the windless.

8. In combination with a fish trap having a heart wall opening therein, upright members at the sides of said opening and stationary relative to said trap, an apron adapted to form a closure between said upright members, guide means fixed to said upright members, travelers mounted at spaced distances along the sides of the apron and adapted to engage and cooperate with the guide means to connect the apron with the upright members and permit vertical movement of the apron relative to the upright members, and means at the lower end of said apron adapted to automatically conform with the bottom and thereby cooperate with the apron to effect a complete closure of the space between the upright members, said means comprising a base bar disposed horizontally at the lower end of the apron, said base bar having a plurality of vertical guideways, and a plurality of elongated members vertically slidable in said guideways.

WILLIAM C. BECKMANN.